US010569884B2

(12) United States Patent
Morgan

(10) Patent No.: US 10,569,884 B2
(45) Date of Patent: Feb. 25, 2020

(54) AIRCRAFT PASSENGER SEAT WITH ENHANCED LIE FLAT POSITION SPACING

(71) Applicant: Rockwell Collins, Inc., Cedar Rapids, IA (US)

(72) Inventor: Edward William Morgan, Winston-Salem, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 272 days.

(21) Appl. No.: 15/668,364

(22) Filed: Aug. 3, 2017

(65) Prior Publication Data

US 2017/0327232 A1    Nov. 16, 2017

Related U.S. Application Data

(63) Continuation-in-part of application No. 15/349,587, filed on Nov. 11, 2016, now Pat. No. 10,532,817.

(60) Provisional application No. 62/301,782, filed on Mar. 1, 2016, provisional application No. 62/253,853, filed on Nov. 11, 2015.

(51) Int. Cl.
    *B64D 11/06* (2006.01)

(52) U.S. Cl.
    CPC ...... *B64D 11/0606* (2014.12); *B64D 11/0601* (2014.12); *B64D 11/0604* (2014.12); *B64D 11/0605* (2014.12); *B64D 11/0641* (2014.12); *B64D 11/0643* (2014.12); *B64D 11/0646* (2014.12)

(58) Field of Classification Search
    CPC ............ B64D 11/0606; B64D 11/0601; B64D 11/0604; B64D 11/0605; B64D 11/0641; B64D 11/0643; B64D 11/0646
    See application file for complete search history.

(56) References Cited

U.S. PATENT DOCUMENTS

| 2012/0223186 A1 | 9/2012 | Henshaw |
| 2015/0136905 A1* | 5/2015 | Orson ............... B64D 11/06 244/118.6 |
| 2015/0166182 A1 | 6/2015 | Ducreux et al. |

(Continued)

FOREIGN PATENT DOCUMENTS

WO    2015083086 A1    6/2015

OTHER PUBLICATIONS

International Search Report received for PCT Patent Application No. PCT/US2016/061609, dated Jan. 2, 2017, 2 pages.

*Primary Examiner* — Anthony D Barfield

(74) *Attorney, Agent, or Firm* — Clements Bernard Walker

(57) ABSTRACT

In an illustrative embodiment of an aircraft cabin passenger seating arrangement, first and second adjacent passenger seats are positioned at different angles with reference to a longitudinal axis of an aircraft, and longitudinally offset from each other such that the first seat is positioned forward of the second seat by an amount less than a length of the second passenger seat when in the lie-flat position. The first and second adjacent passenger seats may be longitudinally offset from a third passenger seat separated from the second passenger seat by an aisle, the third passenger seat disposed proximate a fourth passenger seat, such that a row of passenger seats includes two staggered groups of passenger seating. The first passenger seat may be vertically offset from the second passenger seat.

20 Claims, 10 Drawing Sheets

(56) References Cited

U.S. PATENT DOCUMENTS

2015/0166184 A1 6/2015 Dryburgh et al.
2017/0240283 A1* 8/2017 Dowty ............... B64D 11/0604

* cited by examiner

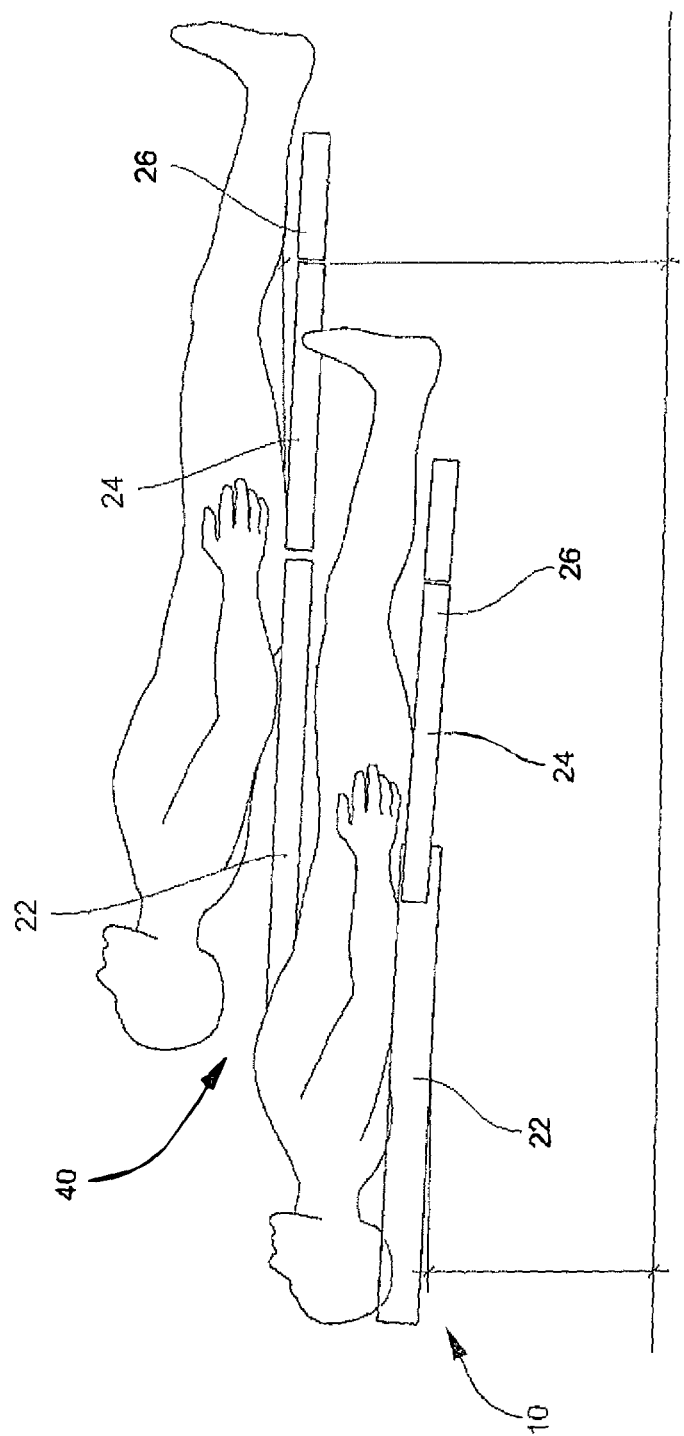

AIRCRAFT PASSENGER SEAT WITH ENHANCED LIE FLAT POSITION SPACING

RELATED APPLICATIONS

This application is a continuation-in-part of and claims priority to U.S. patent application Ser. No. 15/349,587 entitled "Aircraft Seating Arrangement with Enhanced Lay Flat Position Spacing" and filed Nov. 11, 2016, which claims priority to U.S. Provisional Patent Application Ser. No. 62/301,782, entitled "Aircraft Passenger Seat with Enhanced Lie Flat Position Spacing," filed Mar. 1, 2016 as well as U.S. Provisional Patent Application Ser. No. 62/253,853, entitled "Aircraft Passenger Seat with Enhanced Lie Flat Position Spacing," filed Nov. 11, 2015. All above identified applications are hereby incorporated by reference in their entireties.

BACKGROUND

The present invention relates to aircraft passenger seats with enhanced lie flat position spacing in business class aircraft passenger seating areas for long haul flights on aircraft such as the Boeing 777. Business class seating occupies a product niche between first class premium seating where comfort and luxury is the overriding concern, and main cabin, coach seating where the number of seat occupants capable of being comfortably seated within a given area is a principal concern. In each case, regulations governing every aspect of seating design utilization must be complied with. In addition, passenger expectations must be considered and correlated with the level of seating offered in each area of the aircraft.

Lie flat seating is becoming more prevalent in business class seating, where less space is available for each passenger than in first class, but more space than in coach class. For this reason, passenger density must be carefully managed in the business class area of the aircraft even as more comfort is offered to the business class passenger. Various seating arrangements have been developed for use in both first class and business class cabins that permit the seat occupant to rest in a prone or almost prone position, rather than simply reclining somewhat from the upright seat position. These arrangements include seats that are positioned at an oblique angle to the longitudinal axis of the aircraft, fore and aft staggered in relation to adjacent seats, angled in relation to adjacent seats and/or reversed in facing direction to adjacent seats, and the like.

This invention applies certain of these principles to a seating arrangement that also includes a minimal degree of overlap and vertical spacing between adjacent seats, resulting in an increase in passenger density without significantly changing the space provided to each passenger.

SUMMARY OF ILLUSTRATIVE EMBODIMENTS

It is therefore an object of various embodiments to provide a business class passenger seating arrangement with enhanced lie flat position spacing.

It is a further object of some embodiments to provide a business class passenger seating arrangement that provides vertical spacing between adjacent passengers when in the lie flat seating configuration.

It is a further object of various embodiments to provide a business class passenger seating arrangement with vertical spacing between adjacent passengers when in the lie flat seating configuration seating and at the same level when the seats are in the upright and recline positions.

These and other objects and advantages of some embodiments may be achieved by providing at least first and second adjacent passenger seats positioned at different angles with reference to a longitudinal axis of an aircraft, and staggered in relation to each other such that the first seat is positioned forward of the second seat by an amount less than a full-length dimension of the first and second seats. Various embodiments may accommodate more business class seats in an area designated to seat business class passengers. This facilitation may be a result of disposing a bed surface of a first seat spaced vertically higher than the bed surface of a second seat.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 5A and 5B depict example schematic side elevations illustrating that a passenger in an exemplary lie flat position on a first exemplary seat may be positioned at a different height and in an aft position relative to a passenger in a lie flat position on a second exemplary seat.

DETAILED DESCRIPTION OF ILLUSTRATIVE EMBODIMENTS

The description set forth below in connection with the appended drawings is intended as a description of various embodiments of the disclosed subject matter and is not necessarily intended to represent the only embodiments. In certain instances, the description includes specific details for the purpose of providing an understanding of the disclosed embodiments. However, it will be apparent to those skilled in the art that the disclosed embodiments may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Figure 1:
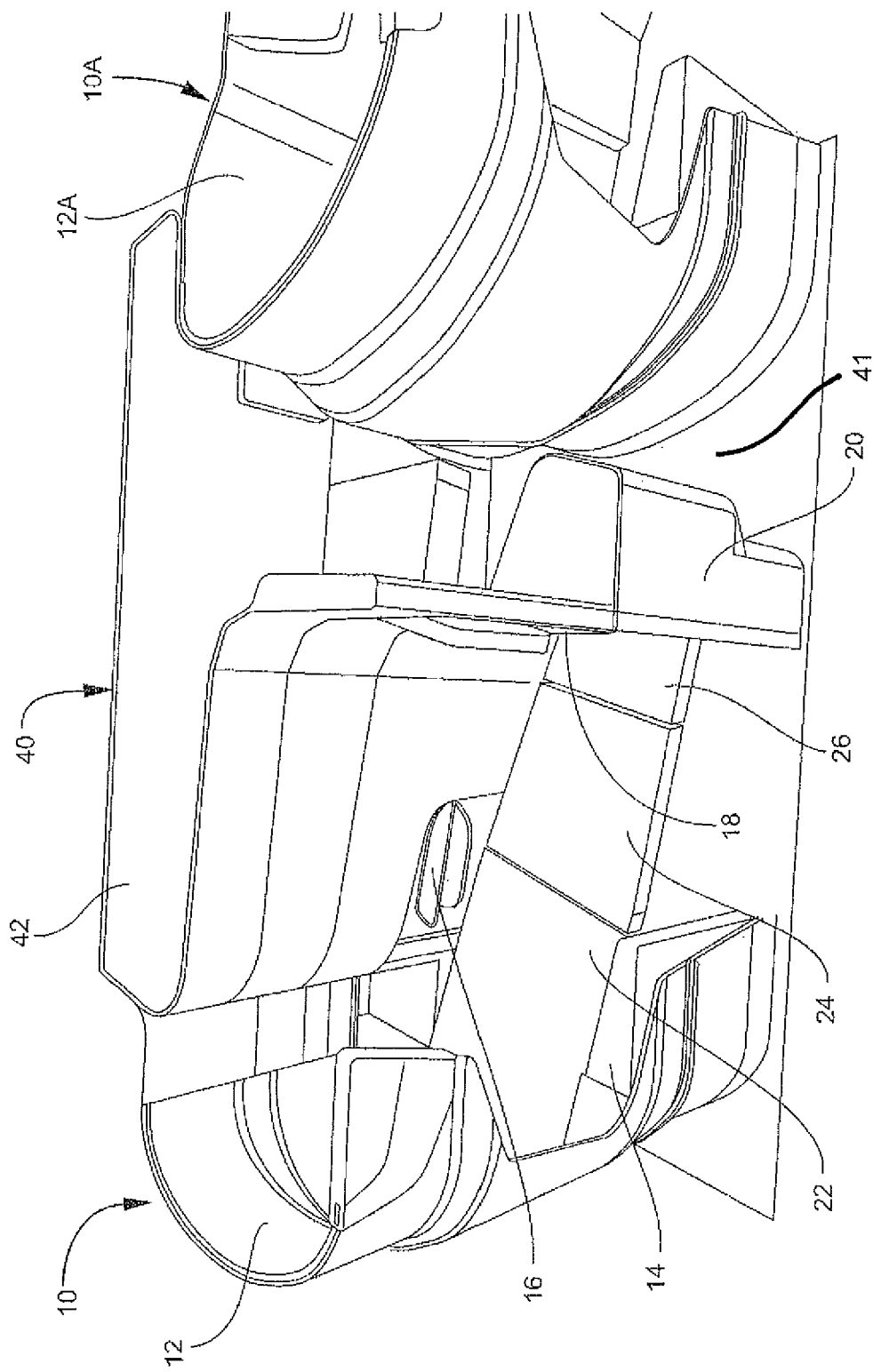
FIG. 1 depicts a side perspective view of exemplary first and second adjacent business class passenger seats in an exemplary lie flat position.
Figure 2:
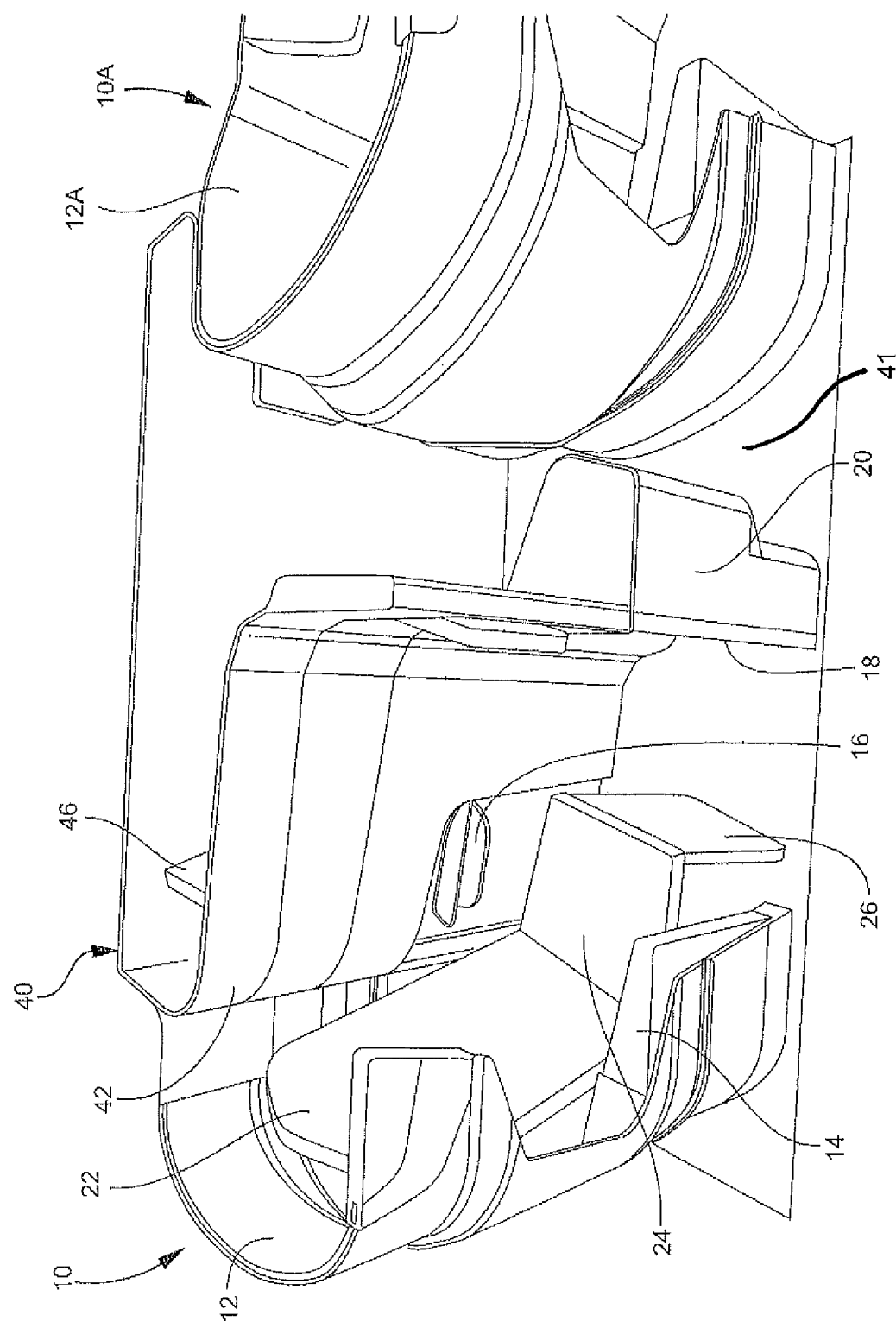
FIG. 2 depicts a side perspective view of exemplary first and second adjacent business class passenger seats in an exemplary upright seating position.

In FIGS. 1 and 2, two exemplary adjacent business class seats 10 and 40 are illustrated. FIG. 1 depicts a side perspective view of the first and second adjacent business class passenger seats 10 and 40 in an exemplary lie flat position. FIG. 2 depicts a side perspective view of the first and second adjacent business class passenger seats 10 and 40 in an exemplary upright seating position. In the depicted embodiment, the seats 10 and 40 are staggered in relation to each other such that the seat 40 is positioned somewhat forward of the seat 10. In various embodiments, the degree of offset may vary depending on the size of the business class cabin and the extent to which an increase in passenger seating density in the business class cabin may be considered necessary or desirable. The degree of offset, for example, may be between 18 inches and 48 inches. In a particular example, the degree of offset may be selected to provide for clearance for a passenger seated in seat 40 to pass by the seat 10 when accessing the seat 40.

In the illustrated embodiment, the seat 10 includes a stationary privacy shell 12, armrests 14 and 16, and a convenience/entertainment center 18. In some examples, the seat 10 may include a video monitor. The seat 10 also includes seat back 22, seat bottom 24 and leg rest 26 which, in the lie flat configuration shown in FIG. 1, collectively form the lie flat bed. In other embodiments, rather than or in addition to the leg rest 26, an ottoman spaced apart from the seat 10 may complete the lie-flat bed configuration. In the depicted embodiment, a foot well 20 may permit the feet and lower legs of a passenger seated in seat 10 to extend forward and be supported when a passenger is in a lie-flat position on the seat 10, as depicted in FIG. 1. In some embodiments, the seats 10 and 40 may additionally include other features and amenities such as meal trays that are not shown. In the embodiment depicted in FIG. 1, the seat bottom 24 and the leg rest 26 are adapted to retain a passenger in a substantially lie flat position. In the embodiment illustrated in FIG. 2, the seat bottom 24 and the leg rest 26 are adapted to retain a passenger in a substantially upright seating position. Intermediate positions may also be provided for passengers seated in seats 10 and 40, such as a reclined or lounge position.

Figures 3A, 3B:
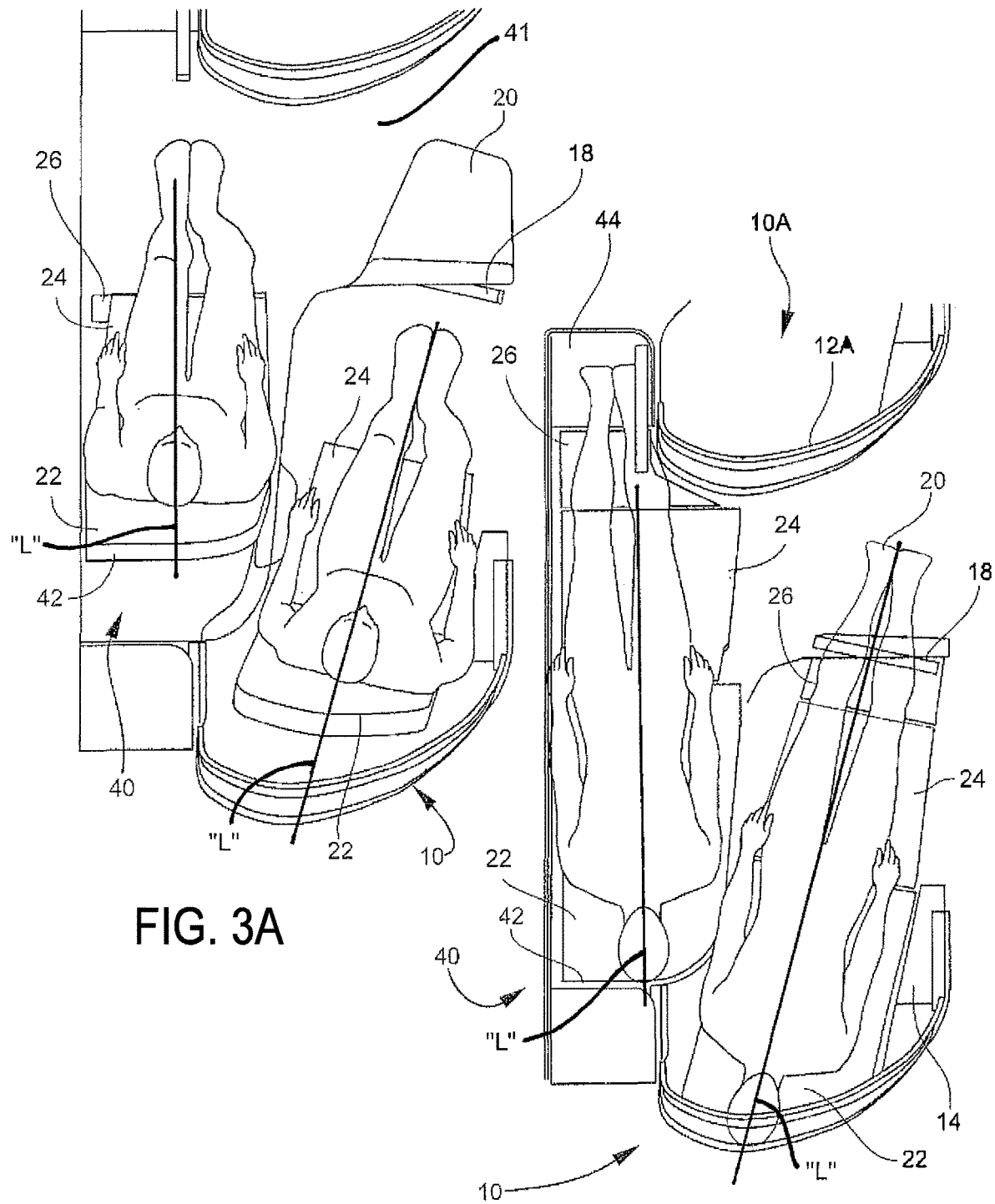
FIGS. 3A and 4A depict a top plan view of the first and second seats in an exemplary upright seating position.
FIGS. 3B and 4B depicts a top plan view of the first and second seats of FIGS. 3A and 4A, respectively, in an exemplary lie flat position.

FIG. 3A depicts a top plan view of the first and second seats such as the seats depicted in FIGS. 1 and 2 in an exemplary upright seating position. FIG. 3B depicts a top plan view of the first and second seats of FIG. 3A in an exemplary lie flat position. In FIGS. 3A and 3B, the seat 40 includes a stationary privacy shell 42. In an illustrative example, the depicted seat 40 may include an armrest. In some embodiments, the depicted seat 40 may include a convenience center adapted to retain personal articles, books, mobile devices, or work-related accessories items. In various examples, the depicted seat 40 may include an entertainment center, configured to operably accommodate electronic multimedia systems. In various designs, the depicted seat 40 may include a video monitor. The foot well 44 may permit the passenger's feet and lower legs of to extend forward and be supported when the passenger is in the lie-flat position on the seat 40. In the illustrated embodiment, the seat 40 also includes seat back 46, seat bottom 48, and leg rest 50. In the embodiment depicted in FIG. 3B, the seat 40, seat back 46, seat bottom 48, and leg rest 50 are configured to form an exemplary lie flat bed.

As illustrated in FIGS. 3A and 3B, in some embodiments, the seats 10 and 40 partially laterally align each other. For example, in the embodiment depicted in FIGS. 3A and 3B, the head and shoulder areas of seat 40 overlap seat 10 in the area of the armrest 16 and seat bottom 24 along a latitudinal axis of the aircraft (e.g., in the circumstance, for example, where seat 40 is aligned at a window side of the aircraft cabin). Further, seat 10 is offset from seat 40 such that if the longitudinal axes of the seats 10 and 40 are extended in the aft direction they will intersect. In the depicted embodiment, the longitudinal axes of the seats 10 and 40 would intersect at a point well aft of the shells 12 and 42. The offset of seat 10 relative to seat 40, for example, allows seat 10 to utilize space adjacent to a footwell 44A while providing additional room for egress for the passenger seated in seat 40 by creating a path along the curved aisle-side surface of the shell 12A.

In an illustrative example, in the embodiment depicted in FIGS. 3A and 3B, the foot well 44 of seat 40 is laterally offset from the longitudinal axis of the seat 40 to accommodate the shell 12A of the seat 10A that is positioned forward of and longitudinally aligned with shell 12 of seat 10. In some embodiments, such asymmetric configurations laterally offset from the longitudinal axis may be repeated along the length of a business class cabin.

Figures 4A, 4B:
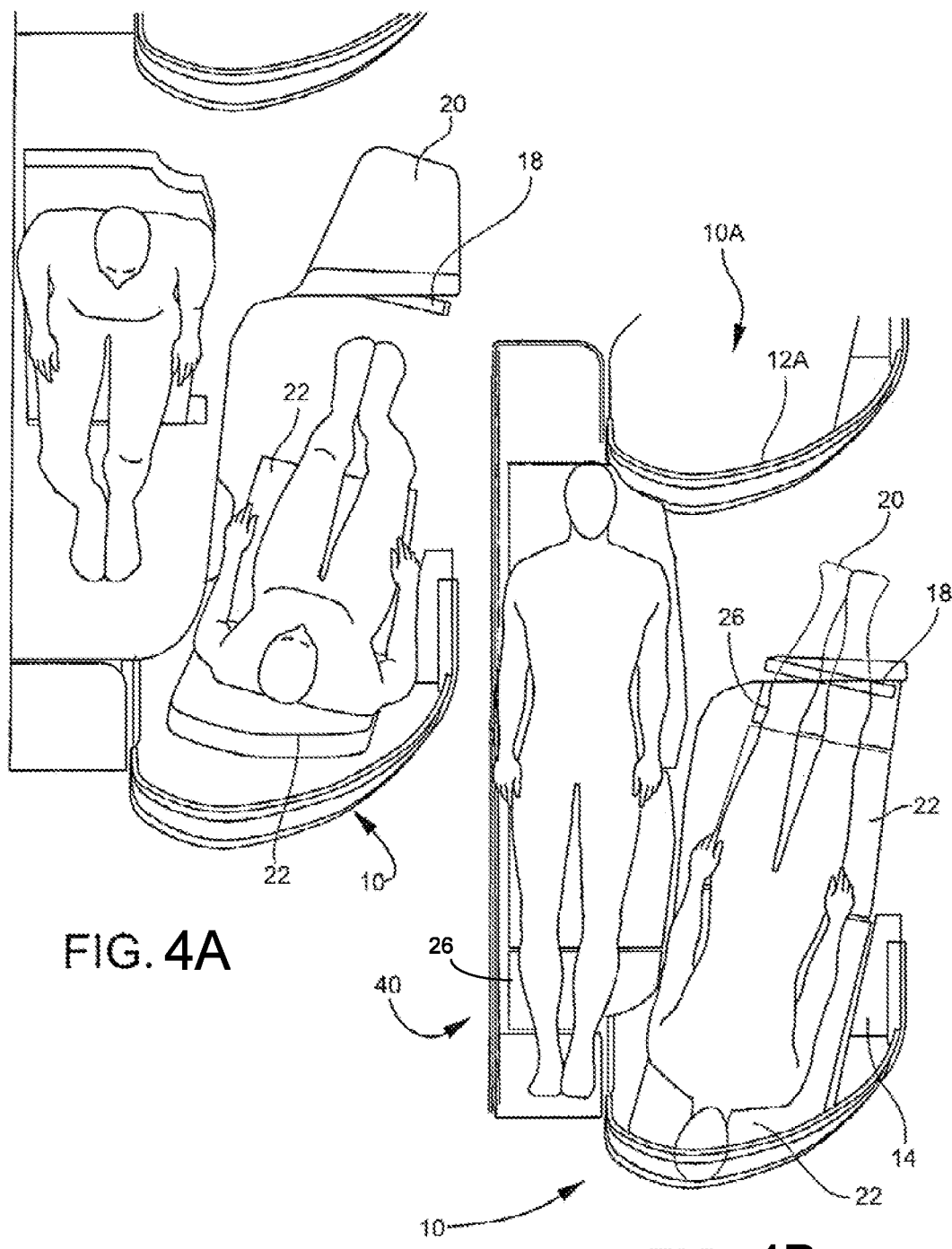

Turning to FIGS. 4A and 4B, alternatively, seat 40 may be oriented in a substantially opposite direction than seat 10, such that a passenger seated in seat 40 may be fore-positioned within the aircraft cabin, while a passenger seated in seat 10 may be substantially aft-positioned (e.g., at an offset from the longitudinal axis of the aircraft cabin). As illustrated in FIG. 4A, in an upright position, seat 40 may not laterally align at all with seat 10 while, as illustrated in FIG. 4B, in the lie-flat position, the seat back 22 of seat 10 may laterally align with the footrest 26 (or footwell region or ottoman) of seat 40. In this configuration, the passenger suite provided by seat 40, tapering at the footwell region, provides additional nested width for a shoulder region of the passenger seat 10. This configuration may also provide additional clearance for the passenger of seat 40 to enter the aisle region unobstructed by the passenger seat 10 because of a gap existing between the shoulder region provided to the passenger of seat 40 and the footwell region provided for the passenger of seat 10. However, different safety regulations may apply to aft-facing seating, increasing difficulty and expense of approval for the aft-facing passenger seat 10. Additionally, passengers accustomed to fore positioning within the cabin may prefer positioning in a forward direction rather than aft-faced seating.

Figure 5B:
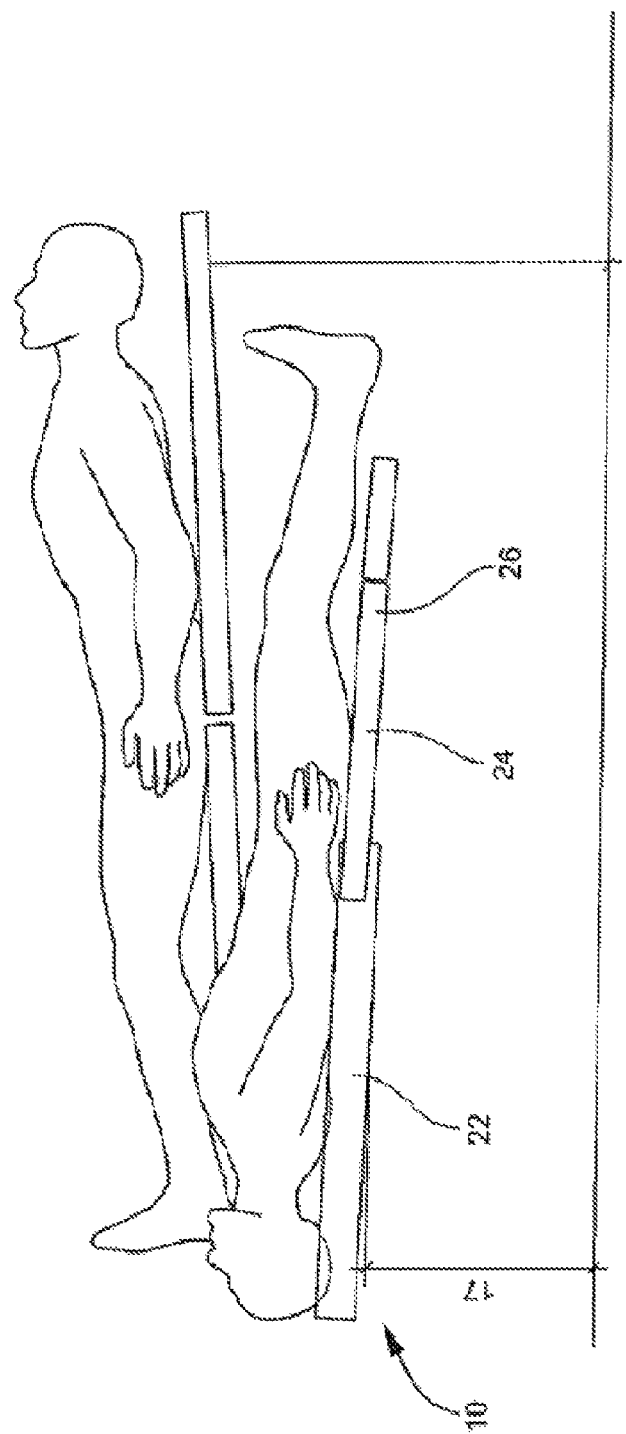

FIG. 5A depicts a schematic side elevation illustrating that a passenger in an exemplary lie flat position on a first exemplary seat 40 may be positioned at a different height and in an aft position relative to a passenger in a lie flat position on a second exemplary seat 40. In FIG. 5B, exemplary vertical and staggered fore and aft orientations of seats 10 and 40 are illustrated. In some embodiments, such vertical offset may create additional space to enhance the comfort of both passengers.

In some designs, additional space created by such vertical offset may not have been available if the bed surfaces were at the same vertical position. For example, the portion of partition 42 separating seat 10 from seat 40 may curve outwards as it extends upwards, such that the arm rest 16 of seat 10 (see FIG. 2) extends partially beneath an upper edge of the partition 42. In another example, in the lie-flat position, one or more portions of the seat 10 may align, upon moving into the lie-flat position, with surfaces adjacent to the seat 10 to create an extended bed surface for a passenger seated in seat 10. In a particular example, adjacent surfaces may be provided along the arms, torso, or legs of the passenger seated in seat 10. In a further example, in the lie-flat position, the seat 10 may align with a spaced-apart ottoman such that feet of the passenger may extend onto the ottoman.

In another example, in lifting seat 40 relative to seat 10, the passenger seated in seat 40 can take advantage of this widening for more shoulder room while the overall footprint of the nested partitions surrounding the passenger seats 40 and 10 may be reduced. In various embodiments, the degree of overlap or displacement between the upper seat 40 and the lower seat 10 may be a small distance. In an illustrative example, the vertical displacement between the upper seat 40 and the lower seat 10 may be only several inches. In some examples, the vertical displacement between the upper seat 40 and the lower seat 10 may be less than 15 inches or about twelve inches. In an example, the vertical displacement between the upper seat 40 and the lower seat 10 may be at least three inches. In some embodiments, the upper seat 40 and/or its surrounding accessories (e.g., arm rest, storage region(s), entertainment system element(s), etc.) may laterally project above a lower edge of the partition 42 by only a few inches. In some examples, the lateral projection of at least one portion of the upper seat 40 and/or its surrounding accessories above the lower edge of the partition 42 may be less than 5 inches or about three inches.

As illustrated in FIG. 5B, in one example, the footwell area provided for the passenger of seat 10 may be partially disposed beneath the backrest of the seat 40 (e.g., within an area that would be behind the backrest of seat 40 when seat 40 is in an upright position).

In some exemplary scenarios of use, a passenger may sit at the same height above deck level when in the upright seat position depicted in FIG. 3. In some embodiments, the vertical offset may be created by provision of a different recline linkage in each of the seats 10 and 40. In various embodiments, a vertical offset in a lie flat position may be created by raising seat 40 relative to seat 10, lowering seat. 10 in relation to seat 40, or raising seat 40 and lowering seat 10, to create a vertical offset.

Although FIGS. 5A and 5B illustrate seats 40 and 10 in a slight reclined orientation between a head position and a foot position in a lie-flat mode, in alternative embodiments, seats 40 and 10 recline to a fully horizontal position. For example, rather than the head and torso of the passenger illustrated in seat 10 of FIG. 5B laterally overlapping a foot and calf position of the passenger illustrated in seat 40, in a horizontal configuration, the passenger illustrated in seat 10 may be positioned almost entirely beneath a position of the passenger seated in seat 40. In this manner, for example, a separating partition may widen above the passenger seated in seat 10 and narrow below the passenger seated in seat 40, thereby providing increased space for each of the passengers.

Figure 6A:
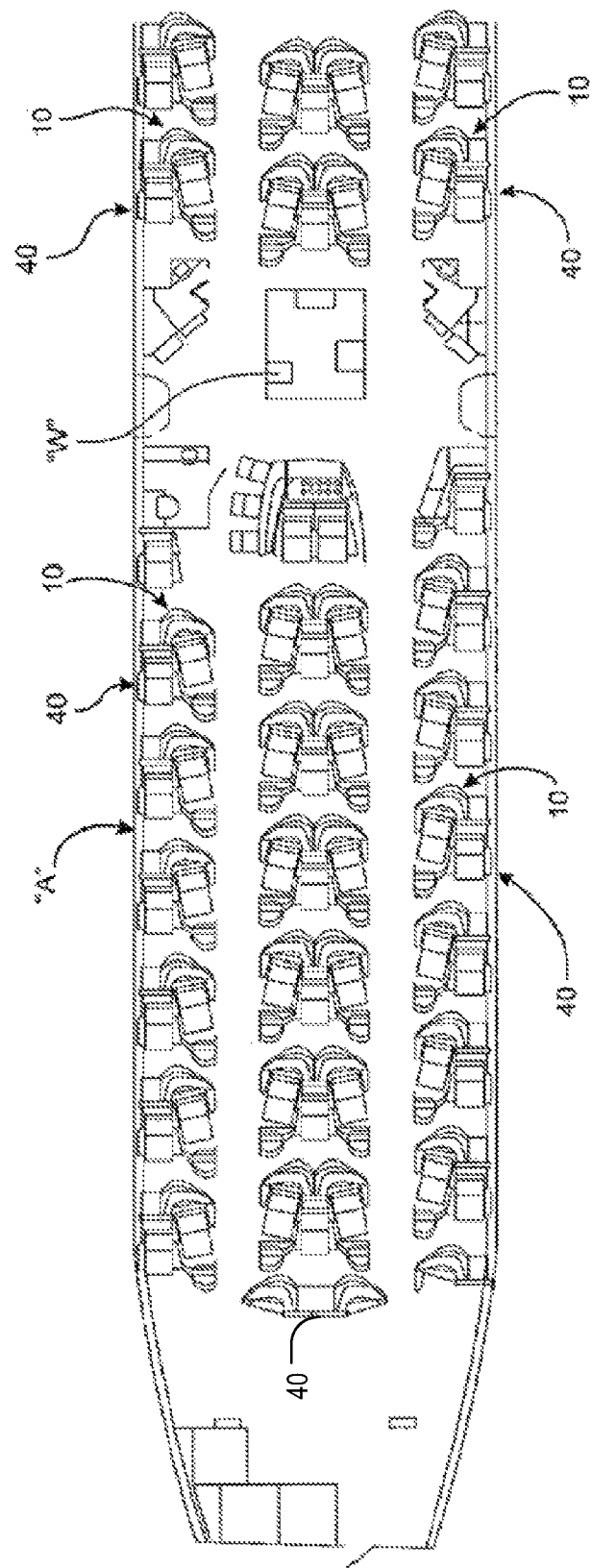
FIGS. 6A-6D depict example floorplans of an exemplary aircraft cabin containing lie flat seats.
Figure 6B:
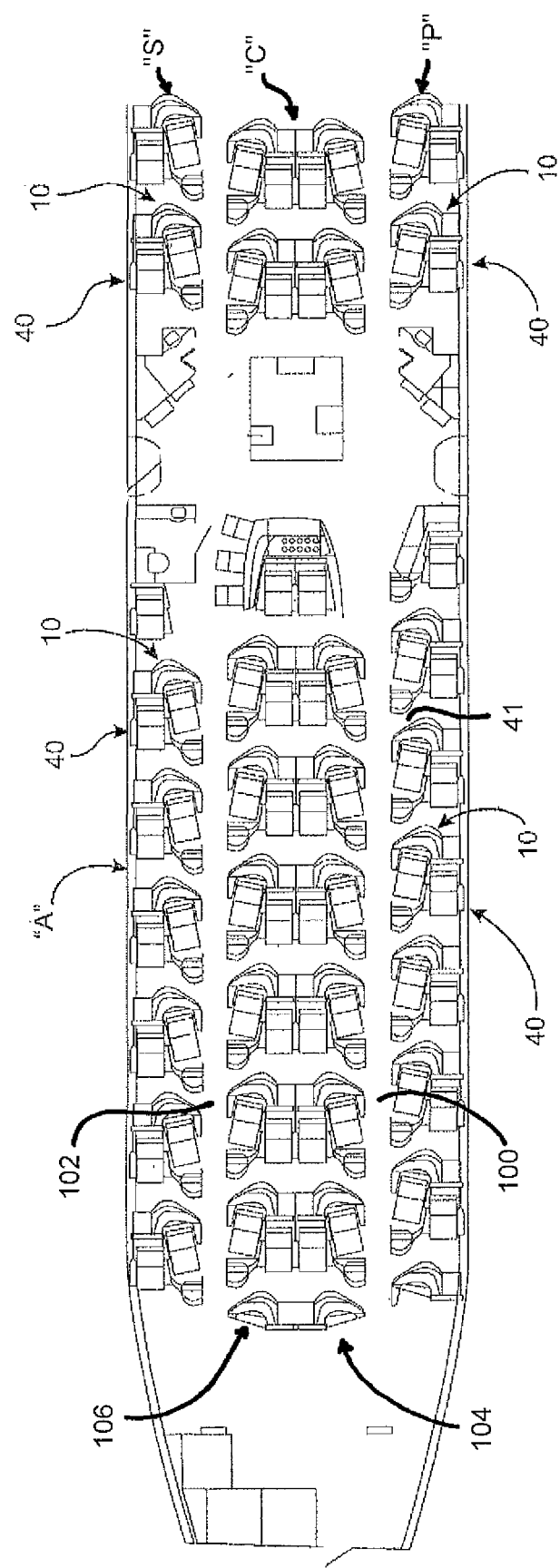
Figure 6C:
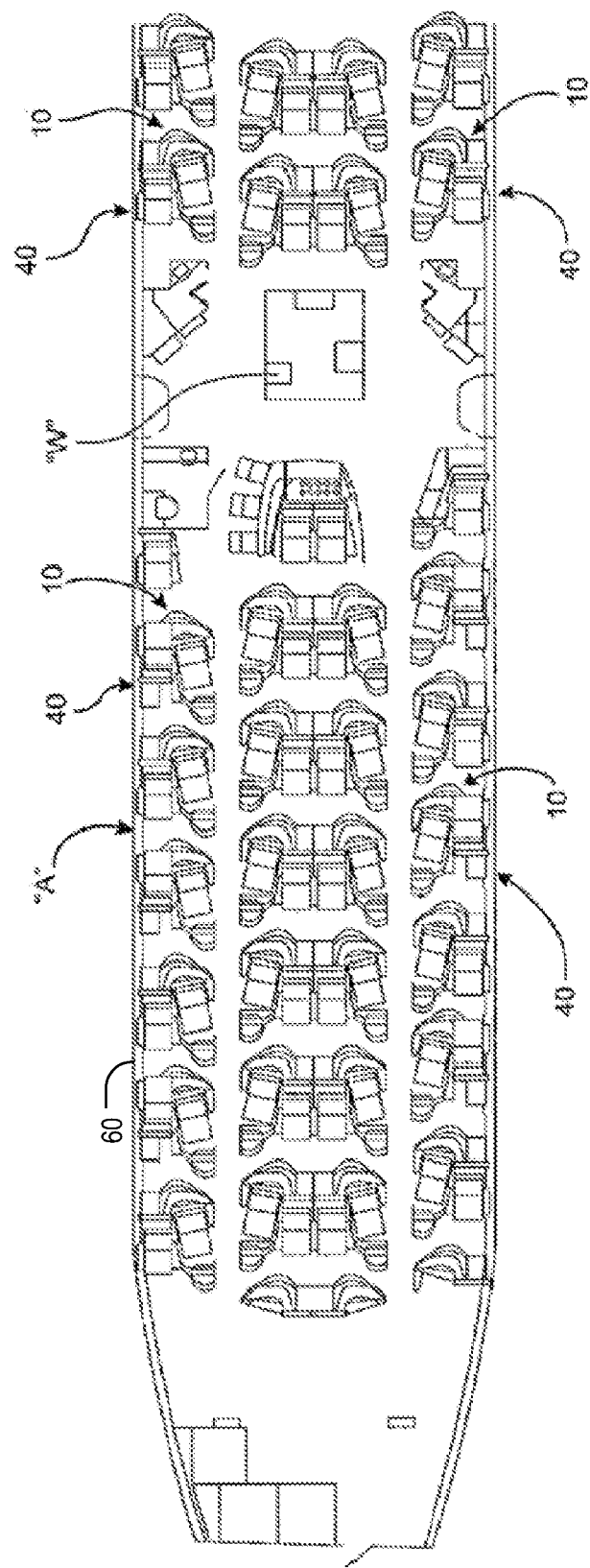

FIGS. 6A through 6C depict illustrative floorplans of an exemplary aircraft cabin containing lie flat seats in two example embodiments. The floorplans, for example, may be laid out using the seating configurations illustrated in FIGS. 3A and 3B and/or FIGS. 4A and 4B.

Turning to FIG. 6A, an example aircraft cabin "A" floorplan is shown illustrating an exemplary cabin arrangement of the seats 40 aligned with a longitudinal axis of the aircraft cabin and the seats 10 offset from the longitudinal axis of the aircraft. In the depicted embodiment, seven seats, four longitudinally offset seats 10 and three longitudinally aligned seats 40 extend laterally in rows across the cabin "A," each row having two window groups of two seats each and a center group of three seats. In an illustrative example, positioning the seats 40 in longitudinal alignment with the cabin "A" may take full advantage of the space along the sidewalls of the cabin "A". In the depicted embodiment, the seats 10 define the two aisles.

In the center grouping of each row, in some embodiments, a passenger seated in the longitudinally aligned seat 40 may have the advantage of being able to exit to either aisle of the aircraft. In some embodiments, the longitudinally aligned seats 40 are forward facing, for example as described in relation to FIGS. 3A-B, and 5A. For example, the passenger seated in a given longitudinally aligned seat 40 that is forwardly positioned may be capable of exiting to either the left or the right by moving around a footwell of either the left adjacent or right adjacent longitudinally offset seat 10. In some embodiments, the longitudinally aligned seats 40 are rearward facing, for example as described in relation to FIGS. 4A-4B, and 5B. For example, the passenger seated in a given longitudinally aligned seat 40 that is rearwardly positioned may be capable of exiting to either the left or the right by moving between headrest regions of either the left adjacent or right adjacent longitudinally offset seat 10.

In other embodiments, a passenger seated in the center longitudinally aligned seat 40 may only be provided the opportunity to exit into one of the aisles. For example, for increased privacy, a privacy panel surround may block the passenger from exiting from one of the left and the right. Additionally, one or more passenger suite features, such as a tray table mount, monitor mount, or storage region may bar access to either the left or right aisle.

On some implementations, a portion of the longitudinally aligned passenger seats 40 may be forward facing while another portion of the longitudinally aligned passenger seats 40 are rearwardly facing. For example, to move the headrest sections of the center longitudinally-offset seats 10 as close as possible, it may be more comfortable to arrange the longitudinally aligned seat 10 in the forward position. However, along the windows, to move the headrest region of each of the longitudinally offset seat 40 as close as possible to the window region, each longitudinally aligned seat 10 may be rearwardly positioned to allow the footwell region of the longitudinally aligned seat 10 to nest beneath the lie-flat headrest region of the adjacent longitudinally offset seat 40. Other combinations are possible.

In some embodiments, the two seats 10 and one seat 40 in each center row of the cabin are laterally offset from the pairs of seats 10 and 40 on either side. In other embodiments, the rows of seating may be laterally aligned. In the example illustrated, the pairs of seats 10 and 40 on the right side of the cabin "A" forward of the crew workstation "W" are laterally offset from both the center group of the same row, and the pairs of seats 10 and 40 on the left side of the cabin "A" of the same row. In the embodiment depicted in FIG. 6A, an exemplary seat arrangement aft of the crew workstation "W" is illustrated depicting the left and right side seat pairs 10 and 40 in lateral alignment with each other, but are laterally offset from the center pairs of seats 10 and 40. In an illustrative example, embodiment offsets as just described in this paragraph, and illustrated in FIG. 6A, may result in aisles of substantially uniform width. Further, offsets may be used to better align with other aircraft structures, such as emergency exits and/or lavatory monuments.

Turning to FIG. 6B, in another example cabin seating arrangement, the example cabin "A" floorplan includes the seats 40 aligned with a longitudinal axis of the aircraft cabin and the seats 10 offset from the longitudinal axis of the aircraft. In the depicted embodiment, eight seats, four longitudinally offset seats 10 and four longitudinally aligned seats 40 extend laterally across each row of the cabin "A" in two window groups of two seats each and a center group of four seats each. In the depicted embodiment as in FIG. 6A, the seats 10 define the two aisles. In the illustrated embodiment, the two seats 10 and the two seats 40 in the center of the cabin are laterally offset from the pairs of seats 10 and 40 on either side. In the example illustrated, the pairs of seats 10 and 40 on the right side of the cabin "A" forward of the crew workstation "W" are laterally offset from both the pairs of center seats 10 and 40 in each row, and the pairs of seats 10 and 40 on the left side of the cabin "A". In the embodiment depicted in FIG. 6B, an exemplary seat arrangement aft of the crew workstation "W" is illustrated depicting the left and right side seat pairs 10 and 40 in lateral alignment with each other, but are laterally offset from the center pairs of seats 10 and 40. In an illustrative example, embodiment offsets as just described in this paragraph, and illustrated in FIG. 6B, may result in aisles of substantially uniform width.

As illustrated in FIG. 6B, all longitudinally aligned seats 10 are illustrated in a same orientation (e.g., forward facing). To exit into the aisle, for example, a passenger positioned in one of the longitudinally aligned seats 10 may move around the footrest, foot well or ottoman region of the adjacent longitudinally offset seat 40.

Turning to FIG. 6C, in another example floorplan including a similar row layout to the floorplan of FIG. 6B, window-installed longitudinally aligned seats 10 alternate between forward and aft orientation such that the footrest, footwell, or ottoman regions of longitudinally aligned seats 10 in adjacent sets rows, such as adjacent rows 60, are facing each other. In this manner, passengers seated in the seats 10 of the adjacent rows 60 may exit via the footrest footwell, or ottoman region and around the footrest, footwell, or ottoman region of adjacent longitudinally offset seats 40. The arrangement of 6C, for example, may be preferable since adjacent headrests of longitudinally aligned seats 10 along a window region may be positioned closer together than possible in the seating arrangement of FIG. 6B and, subsequently, the adjacent longitudinally offset seats 40 to those seats may be positioned closer together. Through saving space using alternating orientation, an additional row of seating may be added, or space may be freed up for including additional cabin amenities such as a small galley region or lavatory.

In some embodiments, passenger suites of longitudinally adjacent and facing seats 10 are designed such that two passengers travelling together may have an adjoined (or selectively adjoined via a movable privacy screen or wall) passenger suite space for travel. For example, the passengers seated in the seats 10 of the adjacent rows 60 may be capable of facing each other unobstructed to have conversations during travel. Further, in some implementations, the passengers seated in the seats 10 of the adjacent rows 60 may be provided with shared suite amenities, such as a shared table region or a shared storage region.

Figure 6D:
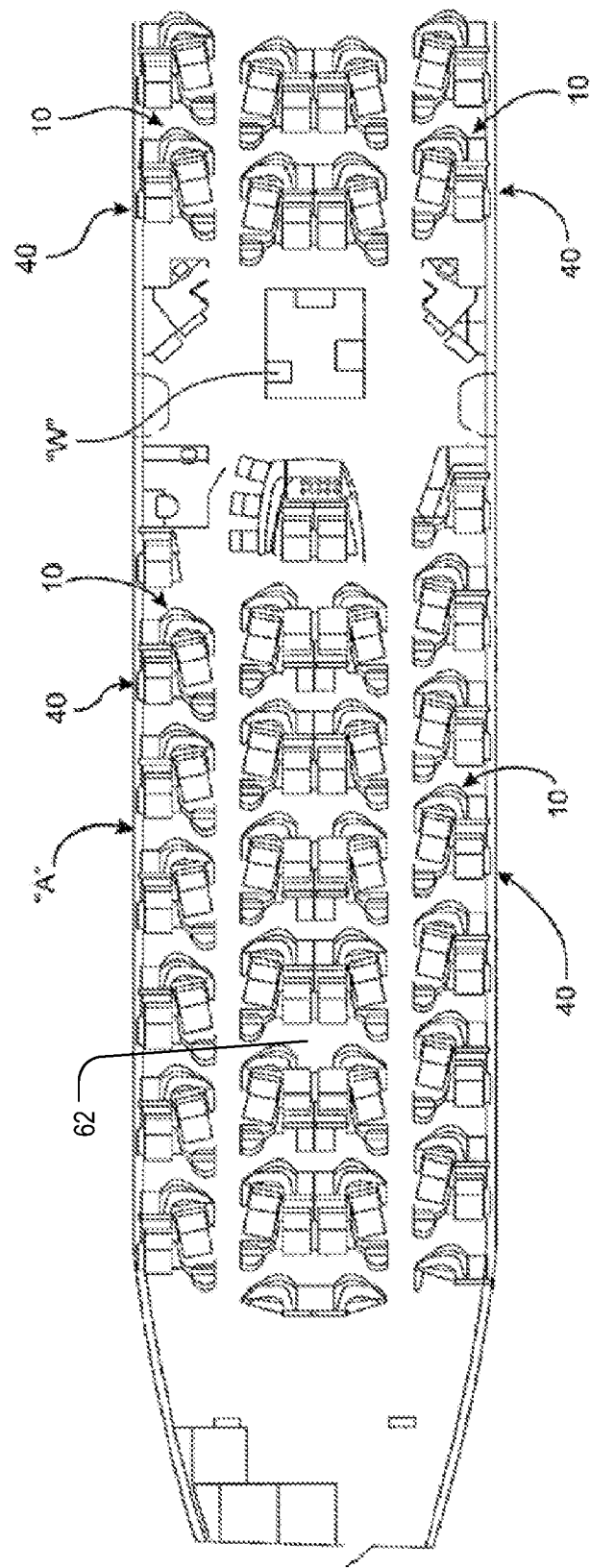

As illustrated in FIG. 6D, in another example floorplan including a similar row layout to the floorplan of FIG. 6B, center-installed longitudinally aligned seats 10 alternate between forward and aft orientation such that the footrest, footwell, or ottoman regions of longitudinally aligned seats 10 in adjacent sets rows, such as adjacent rows 62, are facing each other. In this manner, passengers seated in the seats 10 of the adjacent rows 62 may exit via the footrest, footwell, or ottoman region and around the footrest, footwell, or ottoman region of adjacent longitudinally offset seats 40. The arrangement of 6D, for example, may be preferable since adjacent headrests of longitudinally aligned seats 10 along a window region may be positioned closer together than possible in the seating arrangement of FIG. 6B and, subsequently, the adjacent longitudinally offset seats 40 to those seats may be positioned closer together. In this manner, an additional row of seating may be added, or space may be freed up for including additional cabin amenities such as a small galley region or lavatory.

In some embodiments, passenger suites of longitudinally adjacent and facing seats 10 are designed such that two passengers travelling together may have an adjoined (or selectively adjoined via a movable privacy screen or wall) passenger suite space for travel. For example, the passengers seated in the longitudinally adjacent seats 10 of the adjacent rows 62 may be capable of facing each other unobstructed to have conversations during travel. Further, in some implementations, the passengers seated in the seats 10 of the adjacent rows 62 may be provided with shared suite amenities, such as a shared table region or a shared storage region. Further, the latitudinally adjacent passenger seats 10 of the adjacent rows 62 have be provided with the option of unobstructed access, such that a party of up to 4 passengers may occupy a shared suite space. This may be beneficial, for example, to enable communication between business travelers or families during travel.

Although various embodiments have been described with reference to the Figures, other embodiments are possible. For example, in some embodiments, aircraft passenger seats may be adapted to form an enhanced lie flat position spacing in business class aircraft passenger seating areas for long haul flights on aircraft such as the Boeing 777. In some examples, business class seating may occupy a product niche between first class premium seating where comfort and luxury may be an overriding concern, and main cabin, coach seating, where the number of seat occupants capable of being comfortably seated within a given area may be a principal concern. In the aforementioned illustrative examples, regulations governing aspects of seating design utilization must be complied with. In some exemplary scenarios if use, passenger expectations must be considered and correlated with the level of seating offered in each area of the aircraft.

In some exemplary scenarios of use, lie flat seating is becoming more prevalent in business class seating, where less space may be available for each passenger than in first class, but more space than in coach class. In an illustrative example, passenger density must be carefully managed in the business class area of the aircraft even as more comfort is offered to the business class passenger. Various seating arrangements have been developed for use in both first class and business class cabins that permit the seat occupant to rest in a prone or almost prone position, rather than simply reclining somewhat from the upright seat position. These arrangements may include seats positioned at an oblique angle to the longitudinal axis of the aircraft, staggered fore and aft in relation to adjacent seats, angled in relation to adjacent seats, and/or reversed in facing direction to adjacent seats, and the like.

In various embodiments, some of these principles may be applied to configure a seating arrangement that also includes a minimal degree of overlap and vertical spacing between adjacent seats, which may result in an increase in passenger density without significantly changing the space provided to each passenger. In some embodiments, certain of these principles may be applied to adapt a seating arrangement that also includes a minimal degree of overlap and vertical spacing between adjacent seats, resulting in an increase in passenger density without significantly changing the space provided to each passenger.

Some embodiments may provide a business class passenger seating arrangement with enhanced lie flat position spacing. Various implementations may provide a business class passenger seating arrangement that provides vertical spacing between adjacent passengers when in the lie flat seating configuration. Some designs may provide a business class passenger seating arrangement with vertical spacing between adjacent passengers when in the lie flat seating configuration and at the same level when the seats are in the upright and recline positions.

Various embodiments may achieve one or more advantages. For example, in some designs, at least first and second adjacent passenger seats may be positioned at different angles with reference to a longitudinal axis of an aircraft, and staggered in relation to each other such that the first seat is positioned forward of the second seat by an amount less than a full-length dimension of the first and second seats. In an illustrative example, various implementations may configure a first seat bed surface spaced vertically higher than a bed surface of a second seat, in at least a lie flat position. In exemplary scenarios of use, more business class seats may be accommodated in an area designated for business class passengers, based on configuring the first seat bed surface spaced vertically higher than the bed surface of the second seat, in at least a lie flat position, or in one or more other substantially flat positions.

In some designs, at least first and second adjacent passenger seats may be positioned at different angles with reference to a longitudinal axis of an aircraft, and staggered in relation to each other such that the first seat may be positioned forward of the second seat by an amount less than a full-length dimension of the first seat, and where, in at least a lie flat position, the first seat has a bed surface that may be vertically offset in relation to the bed surface of the second seat, with at least a portion of the first and second seats overlapping the other of the first and second seats. In some implementations, at least first and second adjacent passenger seats may be positioned at different angles with reference to a longitudinal axis of an aircraft and laterally offset in relation to each other in an aircraft cabin such that the first seat may be positioned forward of the second seat by an amount less than a full-length dimension of the first and second seats. In some designs, a first seat may have a bed surface that is spaced vertically higher than the bed surface of the second seat, in at least a lie flat position.

In some embodiments, aircraft passenger seating may be formed based on adapting pairs of seats to retain passengers in vertically offset positions that may be longitudinally offset at different angles with respect to an aircraft centerline. In various implementations, aircraft seating may be configured to retain passengers in vertically and longitudinally offset positions.

In an illustrative example, each of an adjacent pair of aircraft passenger seats may be disposed within an aircraft fuselage or cabin at a longitudinally offset nonzero angle relative to the other seat of the pair of seats. In some embodiments, an aircraft passenger seat may be disposed within an aircraft fuselage or cabin at a nonzero angle relative to an aircraft fuselage or cabin centerline. In various embodiments, each of an adjacent pair of aircraft passenger seats may be disposed within an aircraft fuselage or cabin at a vertically offset nonzero displacement relative to the other seat of the pair of seats.

In some embodiments, a longitudinal axis of each of an adjacent pair of aircraft passenger seats may be positioned within an aircraft fuselage or cabin to intersect aft of the seats at a nonzero angle to each other. In some embodiments, a longitudinal axis of each of an adjacent pair of aircraft passenger seats may be positioned within an aircraft fuselage or cabin to intersect aft of the seats at a nonzero angle to each other in a lie flat configuration. In some embodiments, a longitudinal axis of each of an adjacent pair of aircraft passenger seats may be positioned within an aircraft fuselage or cabin to intersect aft of the seats at a nonzero angle to each other in a reclining configuration, as illustrated by seat 10 and seat 40, depicted in FIGS. 3A-B. In some embodiments, the seats may be positioned within an aircraft fuselage or cabin in opposite orientations such that a longitudinal axis of a first seat in the direction of the headrest intersects a longitudinal axis of the second seat in the direction of the footrest, footwell, or ottoman at a nonzero angle to each other in a reclining configuration, as depicted in FIGS. 4A-4B. In some embodiments, each of an adjacent pair of aircraft passenger seats may be positioned within an aircraft fuselage or cabin at a nonzero vertical displacement relative to each other, as depicted in FIGS. 5A-B.

In some designs, passenger ingress or egress with respect to an aircraft passenger seat may be more challenging as a result of a vertical displacement of the passenger seat. Such passenger ingress or egress difficulty may be mitigated by adapting a ramp easing passenger access to an elevated aircraft passenger seat. For example, the exemplary elevated aircraft passenger seat 40 depicted in FIG. 5A may be provided with a ramp configured on an aircraft cabin floor. In some designs, difficult passenger access due to vertical displacement of an elevated aircraft passenger seat may be mitigated by configuring a step adapted to ease passenger access to the seat.

In some examples, a seat may be vertically displaced down into a cavity disposed in an aircraft cabin floor. In an illustrative example, difficult passenger access due to vertical displacement of a lowered aircraft passenger seat may be mitigated by configuring a well adjacent to the cavity, and adapting the well to ease passenger access to the seat.

In some designs, the cabin floor near an aisle may be elevated more than the cabin floor near a centerline. In some embodiments, a floor step may be provided nearer the cabin centerline, and not closer to windows or an outboard side of the cabin, due to the extra headroom nearer the centerline.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

A number of implementations of aircraft passenger seats with enhanced lie flat position spacing for business class aircraft passenger seating areas have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated, within the scope of the following claims.

What is claimed is:

1. A passenger seating arrangement for an aircraft cabin, comprising:
a first passenger seat comprising a first longitudinal axis arranged at a first angle relative to a longitudinal axis of an aircraft;
a second passenger seat comprising a second longitudinal axis arranged at a second angle relative to the longitudinal axis of the aircraft, the second angle different than the first angle, wherein the second passenger seat is longitudinally offset from the first passenger seat in the aircraft cabin such that a portion of the second passenger seat is laterally adjacent to the first passenger seat when the second passenger seat is in a lie-flat seating position;
a third passenger seat comprising a third longitudinal axis arranged at a third angle relative to the longitudinal axis of the aircraft, the third angle different than the first angle,
wherein
the third passenger seat is longitudinally offset from the second passenger seat such that a portion of the third passenger seat is laterally aligned with the second passenger seat when the third passenger seat is in a lie-flat seating position, and
the third passenger seat is separated from the second passenger seat by longitudinal aisle; and
a fourth passenger seat comprising a fourth longitudinal axis arranged at the first angle, wherein the fourth passenger seat is longitudinally offset from the third passenger seat in the aircraft cabin such that a portion of the fourth passenger seat is laterally adjacent to the third passenger seat when the third passenger seat is in a lie-flat seating position, and
wherein the first passenger seat when in a lie-flat position resides in a first plane at a first vertical position, and the second passenger seat when in a lie-flat position resides in a second plane at a second vertical position lower than the first vertical position, and wherein the third passenger seat when in a lie-flat position resides in the second plane and the fourth passenger seat when in a lie-flat position resides in the first plane, and
wherein the first and fourth passenger seats are positioned apart from the longitudinal aisle, and the second and third passenger seats are positioned directly adjacent the longitudinal aisle.

2. The passenger seating arrangement of claim 1, wherein a head rest of the first passenger seat in the lie-flat seating position is at a first vertical position different from a second vertical position of a head rest of the second passenger seat in the lie-flat seating position.

3. The passenger seating arrangement of claim 2, wherein the first vertical position is higher than the second vertical position by at least three inches.

4. The passenger seating arrangement of claim 2, wherein a difference between the first vertical position and the second vertical position allows for a portion of a bed surface provided to a second passenger seated in the second passenger seat to overlap vertically with a seating region available to a first passenger seated in the first passenger seat.

5. The passenger seating arrangement of claim 4, wherein the portion of the bed surface comprises a portion of an arm rest of the second passenger seat.

6. The passenger seating arrangement of claim 4, wherein the portion of the bed surface overlaps vertically with a partition dividing a first passenger suite including the first passenger seat from a second passenger suite including the second passenger seat.

7. The passenger seating arrangement of claim 1, wherein each of the first longitudinal axis and the second longitudinal axis are parallel to the longitudinal axis of the aircraft.

8. The passenger seating arrangement of claim 1, wherein the second passenger seat and the fourth passenger seat, when in the lie-flat seating position, are each inclined downwards from a respective headrest at a decline angle offset from a floor surface of the aircraft cabin.

9. The passenger seating arrangement of claim 1, wherein a leg rest of each of the second passenger seat and the fourth passenger seat, when in the lie-flat seating position, extends into a footwell region of a respective passenger suite.

10. The passenger seating arrangement of claim 1, wherein the first and second passenger seats are both generally forward facing.

11. The passenger seating arrangement of claim 1, wherein the second angle is opposite the third angle such that a footrest end of the second passenger seat when in the lie-flat seating position angles toward a footrest end of the third passenger seat when in the lie-flat seating position.

12. A passenger seating arrangement for an aircraft cabin, comprising:
a starboard side seating group comprising a first plurality of rows, each row of the first plurality of rows comprising a first passenger seat and a second passenger seat,
wherein
the first passenger seat comprises a first longitudinal axis arranged at a first angle relative to a longitudinal axis of an aircraft, the second passenger seat comprises a second longitudinal axis arranged at a second angle relative to the longitudinal axis of the aircraft different than the first angle, and the second passenger seat is longitudinally offset from the first passenger seat in the aircraft cabin such that a portion of the second passenger seat is laterally adjacent to the first passenger seat when the second passenger seat is in a lie-flat seating position;

a center seating group comprising a second plurality of rows, each row of the second plurality of rows comprising a third passenger seat, a fourth passenger seat, and a fifth passenger seat, wherein the third passenger seat is separated from the second passenger seat by a first aisle, the third passenger seat comprises a third longitudinal axis arranged at a third angle relative to the longitudinal axis of the aircraft, the fourth passenger seat comprises a fourth longitudinal axis arranged at a fourth angle relative to the longitudinal axis of the aircraft different than the third angle, and the fifth passenger seat comprises a fifth longitudinal axis arranged at a fifth angle relative to the longitudinal axis of the aircraft, wherein the fifth angle is equal to and opposite the third angle;

wherein, in each row of the plurality of rows, the second passenger seat is longitudinally offset from the third passenger seat in the aircraft cabin such that a portion of the second passenger seat is laterally adjacent to the third passenger seat when the second passenger seat is in a lie-flat seating position, wherein the first passenger seat when in a lie-flat position resides in a first plane at a first vertical position, and the second passenger seat when in a lie-flat position resides in a second plane at a second vertical position lower than the first vertical position, wherein the third passenger seat when in a lie-flat position and the fifth passenger seat when in a lie flat position reside in the second plane, and wherein the fourth passenger seat when in a lie-flat position resides in the first plane, and wherein the first and fourth passenger seats are positioned apart from the first aisle, the second and third passenger seats are positioned directly adjacent the first aisle, and the fifth passenger seat is positioned directly adjacent a second aisle parallel to the first aisle.

13. The passenger seating arrangement of claim 12, further comprising:

a port side seating group comprising a third plurality of rows, each row of the third plurality of rows comprising a sixth passenger seat and a seventh passenger seat, wherein the sixth passenger seat comprises a sixth longitudinal axis arranged at a sixth angle relative to the longitudinal axis of the aircraft, and the seventh passenger seat comprises a seventh longitudinal axis arranged at the first angle;

wherein the fifth passenger seat is longitudinally offset from the sixth passenger seat in the aircraft cabin such that a portion of the fifth passenger seat is laterally adjacent to the sixth passenger seat when the fifth passenger seat is in a lie-flat seating position, and wherein the sixth passenger seat when in a lie-flat position resides in the second plane and the seventh passenger seat when in a lie-flat position resides in the first plane, and wherein the sixth passenger seat is positioned directly adjacent the second aisle and the seventh passenger seat is positioned apart from the second aisle.

14. The passenger seating arrangement of claim 13, wherein the sixth angle is equal and opposite to the second angle.

15. The passenger seating arrangement of claim 12, wherein the second seating group further comprises a sixth passenger seat disposed between the fourth passenger seat and the fifth passenger seat, wherein the sixth passenger seat comprises a sixth longitudinal axis arranged at the fourth angle.

16. The passenger seating arrangement of claim 12, wherein one of the third passenger seat and the fourth passenger seat is arranged in a forward facing position, and the other of the third passenger seat and the fourth passenger seat is arranged in a rearward facing position.

17. The passenger seating arrangement of claim 12, wherein, in alternating rows of the plurality of rows of the first passenger seating group, one of the first passenger seat and the second passenger seat is arranged in a forward facing position, and the other of the first passenger seat and the second passenger seat is arranged in a rearward facing position.

18. The passenger seating arrangement of claim 12, wherein, in the lie-flat seating position:

the first passenger seat is vertically offset from the second passenger seat, and a portion of a bed surface provided to a second passenger seated in the second passenger seat overlaps vertically with a seating region available to a first passenger seated in the first passenger seat.

19. The passenger seating arrangement of claim 18, further comprising an elevated surface extending from a floor of the cabin area for accessing a vertically higher seat of the first passenger seat and the second passenger seat.

20. The passenger seating arrangement of claim 18, wherein one of the first passenger seat and the second passenger seat raises or lowers while moving into the lie-flat seating position to cause the first passenger seat to be vertically offset from the second passenger seat.

* * * * *